(12) United States Patent
Okazaki et al.

(10) Patent No.: US 11,648,451 B2
(45) Date of Patent: May 16, 2023

(54) GOLF CLUB FITTING APPARATUS

(71) Applicant: SUMITOMO RUBBER INDUSTRIES, LTD., Kobe (JP)

(72) Inventors: Kousuke Okazaki, Kobe (JP); Masahiko Ueda, Kobe (JP); Yuto Nakamura, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/027,323

(22) Filed: Sep. 21, 2020

(65) Prior Publication Data

US 2021/0101065 A1 Apr. 8, 2021

(30) Foreign Application Priority Data

Oct. 4, 2019 (JP) .............................. JP2019-183456

(51) Int. Cl.
*A63B 69/36* (2006.01)
*A63B 24/00* (2006.01)

(52) U.S. Cl.
CPC .......... *A63B 69/36* (2013.01); *A63B 24/0006* (2013.01); *A63B 2220/05* (2013.01); *A63B 2220/20* (2013.01); *A63B 2220/34* (2013.01); *A63B 2220/40* (2013.01); *A63B 2220/62* (2013.01); *A63B 2220/807* (2013.01); *A63B 2220/833* (2013.01); *A63B 2225/50* (2013.01)

(58) Field of Classification Search
CPC ......... A63B 69/36; A63B 69/26; A63B 69/24; A63B 24/0006; A63B 24/0003; A63B 24/00; A63B 2220/05; A63B 2220/62; A63B 2220/807; A63B 2220/40; A63B 2225/50; A63B 2220/20; A63B 2220/34; A63B 2220/30; A63B 2220/00; A63B 2220/833; G01P 15/00
See application file for complete search history.

(56) References Cited

U.S. PATENT DOCUMENTS

| | | | |
|---|---|---|---|
| 2002/0134153 A1* | 9/2002 | Grenlund | A63B 59/50 473/233 |
| 2015/0367174 A1* | 12/2015 | Okazaki | A61B 5/11 473/226 |
| 2015/0375073 A1* | 12/2015 | Kodama | A61B 5/11 473/258 |
| 2016/0089566 A1* | 3/2016 | Mitsunaga | G01P 1/127 702/150 |
| 2017/0065866 A1* | 3/2017 | Okazaki | G09B 19/0038 |
| 2017/0239520 A1* | 8/2017 | Kodaira | A63B 71/0622 |
| 2018/0290034 A1* | 10/2018 | Shimono | A63B 60/46 |

FOREIGN PATENT DOCUMENTS

JP 2017-170105 A 9/2017

* cited by examiner

*Primary Examiner* — Mohamed Charioui
(74) *Attorney, Agent, or Firm* — Birch, Stewart, Kolasch & Birch, LLP

(57) ABSTRACT

Provided is a fitting apparatus configured to acquire measurement data obtained by measuring a swing action of a test club by a golfer with a measurement device, calculate an amount of change in an attitude of a face surface of a head included in the test club in a period before impact at a time of the swing action, based on the measurement data, and select a balance of a golf club suitable for the golfer, according to the amount of change.

4 Claims, 12 Drawing Sheets

Fig.5

| Golfer | Change amount $C_1$ of face angle (deg) | Suitable club |
|---|---|---|
| T1 | 5.878 | Normal |
| T2 | 7.12 | Light balance |
| T3 | 6.576 | Normal |
| T4 | 7.156 | Light balance |
| T5 | 8.96 | Light balance |
| T6 | 6.57 | Light balance |
| T7 | 6.054 | Light balance |
| T8 | 5.454 | Normal |
| T9 | 9.44 | Light balance |
| T10 | 7.22 | Light balance |
| T11 | 5.542 | Normal |
| T12 | 7.654 | Light balance |
| T13 | 7.8 | Light balance |
| T14 | 7.09 | Light balance |
| T15 | 8.35 | Light balance |
| T16 | 7.455 | Light balance |
| T17 | 6.42 | Light balance |
| T18 | 5.186 | Normal |
| T19 | 7.97 | Light balance |
| T20 | 6.584 | Normal |
| T21 | 4.856 | Normal |
| T22 | 7.77 | Light balance |
| T23 | 6.0025 | Normal |
| T24 | 6.872 | Light balance |
| T25 | 4.8825 | Normal |
| T26 | 6.42 | Light balance |
| T27 | 8.172 | Light balance |

GOLF CLUB FITTING APPARATUS

CROSS REFERENCE TO RELATED APPLICATION

This application claims a priority to Japanese Patent Application No. 2019-183456 filed on Oct. 4, 2019, which is hereby incorporated by reference in its entirety.

FIELD OF INVENTION

The present invention relates to a fitting apparatus, method and program for selecting a golf club suitable for a golfer.

BACKGROUND

Conventionally, various fitting methods that involve getting a golfer to take practice hits with test clubs, measuring the action thereof with a measurement device, and selecting a golf club suitable for the golfer based on the measurement data obtained at that time have been proposed. JP 2017-170105A discloses a fitting method that involves calculating indices such as the weight, moment of inertia and shaft stiffness of a golf club suitable for a golfer, based on measurement data, and recommending a golf club that matches these indices to the golfer. According to a fitting method such as the above, it becomes possible to provide golf clubs having specifications suitable for different individuals, and an improvement in shots such as increased distance and reduced lateral deflection is expected.

SUMMARY OF THE INVENTION

Incidentally, one specification of a golf club is an item called "balance". Balance, also known as swing weight, is an index representing how heavy the head feels when a golf club is swung, and influences the swing feel. Generally, balance is represented by a combination of the letters A to E and the numbers 0 to 9, such as "D0", with "heavier" being signified in order of A to E, and "heavier" also being signified as the number becomes larger. The balance being "heavy" means that the center of gravity of the golf club is closer to the head and that the resistance of the head will be more noticeable when the golf club is swung, and, accordingly, could mean that the golf club is harder to swing. Conversely, the balance being "light" means that the center of gravity of the golf club is closer to the grip and that the resistance of the head will be less noticeable when the golf club is swung, and, accordingly, could mean that the golf club is easier to swing.

With regard to balance such as described above, every golfer is different, with some people being better suited to a lighter balance, while others are better suited to a heavier balance. Therefore, a further improvement in shots is expected if golf clubs with a balance suitable for individual golfers can be provided. However, a method of specifying the balance suitable for a golfer has not been proposed heretofore, and, in this regard, it has not always been possible to select golf clubs that were truly suitable for golfers.

An object of the present invention is to provide a fitting apparatus, method and program that enable a golf club having a balance suitable for a golfer to be selected.

A fitting apparatus according to a first aspect includes an acquisition unit configured to acquire measurement data obtained by measuring a swing action of a test club by a golfer with a measurement device, a calculation unit configured to calculate an amount of change in an attitude of a face surface of a head included in the test club in a period before impact at a time of the swing action, based on the measurement data, and a selection unit configured to select a balance of a golf club suitable for the golfer, according to the amount of change.

A fitting apparatus according to a second aspect is the fitting apparatus according to the first aspect, in which the amount of change is an amount of change in a face angle.

A fitting program according to a third aspect causes a computer to execute the following:

acquiring measurement data obtained by measuring a swing action of a test club by a golfer with a measurement device;

calculating an amount of change in an attitude of a face surface of a head included in the test club in a period before impact at a time of the swing action, based on the measurement data; and selecting a balance of a golf club suitable for the golfer, according to the amount of change.

A fitting method according to a fourth aspect includes the following:

acquiring measurement data obtained by measuring a swing action of a test club by a golfer, using a measurement device;

calculating an amount of change in an attitude of a face surface of a head included in the test club in a period before impact at a time of the swing action, based on the measurement data, using a computer; and recommending a golf club having a balance suitable for the golfer that is determined according to the amount of change to the golfer.

According to knowledge gained by the inventors of the present invention, the amount of change in the attitude of the face surface of the head of the golf club in the period before impact at a time of the swing action by a golfer influences the balance of the golf club suitable for that golfer. In this regard, according to the above viewpoint, the balance of a golf club suitable for a golfer is selected, according to this amount of change in the attitude of the face surface. Therefore, it becomes possible to select a golf club with a balance suitable for a golfer.

BRIEF DESCRIPTION OF THE DRAWINGS

FIG. 5 is a table summarizing the relationship between optimal balance and an index representing the amount of change in the attitude of the face surface of the head according to the first embodiment when a large number of golfers have actually taken practice hits with golf clubs.

DETAILED DESCRIPTION OF THE PREFERRED EMBODIMENTS

Description of Embodiments

Hereinafter, a golf club fitting apparatus, method and program according to a number of embodiments of the present invention will be described, with reference to the drawings.

1. First Embodiment 1-1. Schematic Configuration of Fitting System

Figure 1:
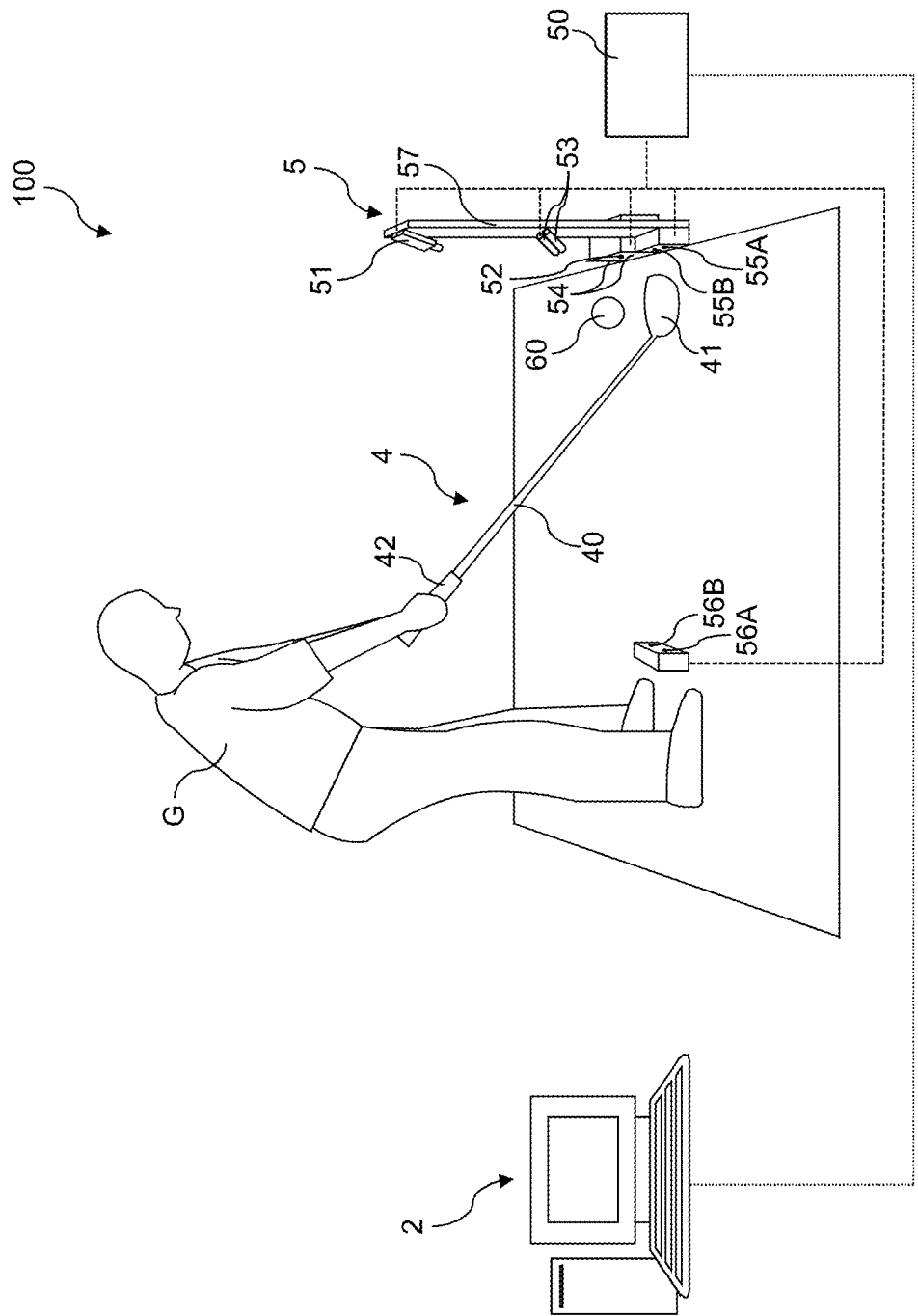
FIG. 1 is a diagram showing a fitting system provided with a fitting apparatus according to a first embodiment.
Figure 2:
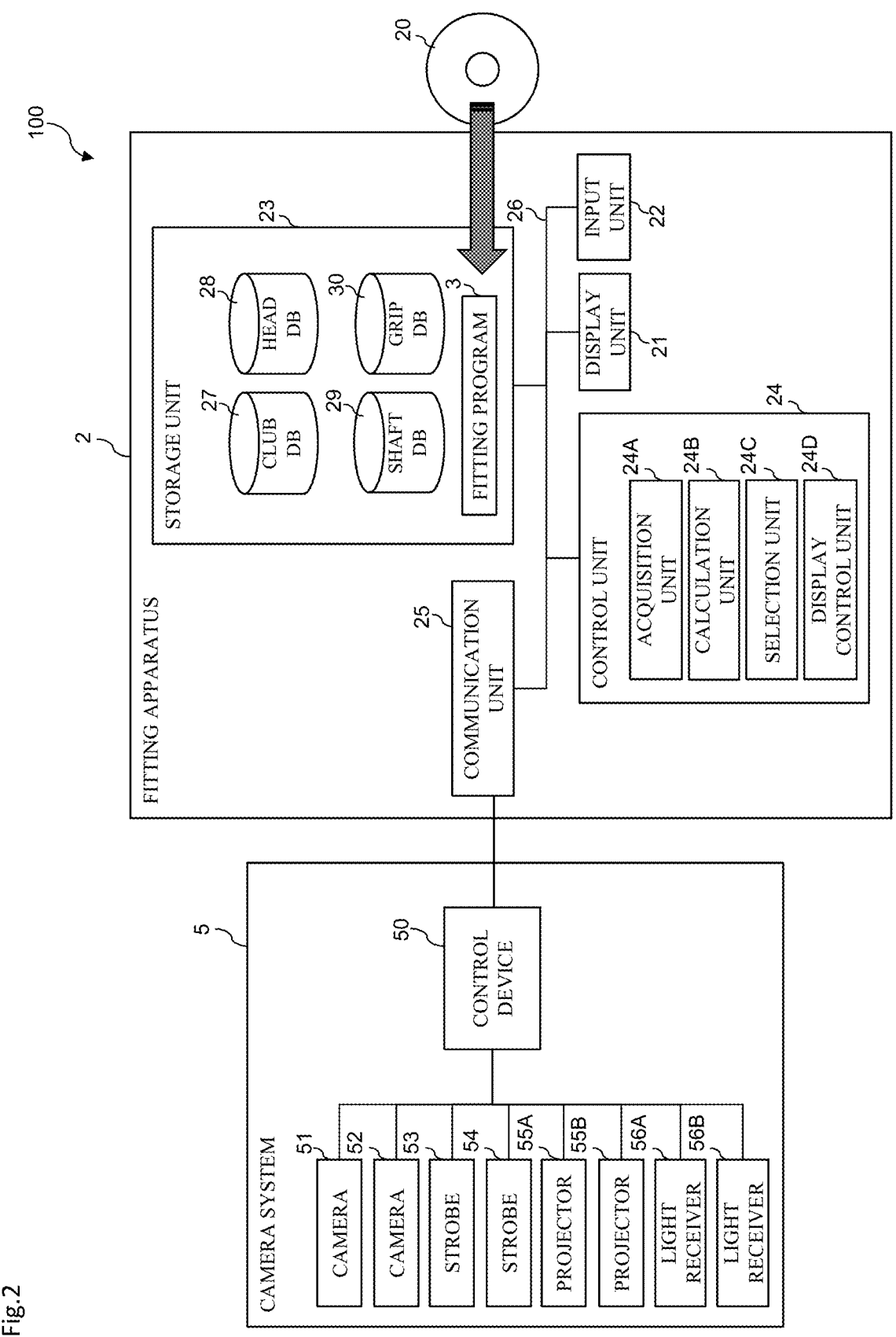
FIG. 2 is a functional block diagram of the fitting system according to the first embodiment.

FIGS. 1 and 2 show the overall configuration of a fitting system 100 provided with a fitting apparatus 2 according to the present embodiment. The fitting apparatus 2 is an apparatus for supporting selection of a golf club suitable for a golfer G, based on measurement data that measures the action of the golfer G swinging a golf club for use in testing (hereinafter, test club) 4. The test club 4 is a common golf club, and includes a shaft 40, a head 41 provided at one end of the shaft 40, and a grip 42 provided at the other end of the shaft 40. The measurement device that measures the swing action is, in the present embodiment, a camera system 5. The fitting apparatus 2 together with this camera system 5 constitutes the fitting system 100.

Hereinafter, the configurations of the camera system 5 and the fitting apparatus 2 will be described, following by a description of the flow of fitting processing.

1-2. Component Configurations 1-2-1. Configuration of Camera System

The camera system 5 is installed in a hitting mat on which the golfer G takes practice hits and measures the swing action of the golfer G standing on the hitting mat, in a dedicated place such as a golf shop or a golf school. As shown in FIGS. 1 and 2, the camera system 5 is provided with a plurality of cameras 51 and 52 and a plurality of strobes 53, 53, 54 and 54, and performs strobe shooting. The camera 51 is fixed to a support stand 57 in front of the golfer and is arranged obliquely above a ball 60 at address, so as to be able to shoot the behavior of the head 41 and the ball 60 around the time of impact from above. The strobes 53 and 53 are also fixed to the support stand 57 and are arranged downward of the camera 51. Also, the camera 52 is arranged forward of the ball 60 at address in front of the golfer G, so as to be able to shoot the behavior of the head 41 and the ball 60 around the time of impact from a different position to the camera 51. The strobes 54 and 54 are arranged on the left and right of the camera 52. Note that dots, lines and other markers are given to the head 41 and the golf ball 60 as appropriate, so as to facilitate extraction of the behavior of the head 41 and the ball 60 from image data shot with the cameras 51 and 52.

Also, the camera system 5 is provided with projectors 55A and 55B and light receivers 56A and 56B, with the projector 55A and the light receiver 56A constituting one timing sensor, and the projector 55B and the light receiver 56B constituting another timing sensor. Timing signals that are generated by these timing sensors are used in determining the timing of light emission by the strobes 53, 53, 54 and 54 and shooting by the cameras 51 and 52 that follows light emission.

Furthermore, the camera system 5 is also provided with a control device 50 for controlling the operations of the above devices 51 to 56B. The control device 50 has a CPU, a ROM, a RAM and the like, and is also connected to the communication unit 25 of the fitting apparatus 2, in addition to the devices 51 to 56B.

The projectors 55A and 55B are arranged downward of the camera 51 near the ground in front of the golfer G. On the other hand, the light receivers 56A and 56B are arranged near the toes of the golfer G. The projector 55A and the light receiver 56A are arranged on a straight line roughly parallel to a direction in front of the golfer G's back toward his abdomen, and oppose each other (refer to FIG. 1). The projector 55B and the light receiver 56B are similarly arranged. The projectors 55A and 55B constantly emit light respectively toward the light receivers 56A and 56B during the swing action by the golfer G, and the light receivers 56A and 56B receive this light. However, at the timing at which the test club 4 passes between the projectors 55A and 55B and the light receivers 56A and 56B, the light from the projectors 55A and 55B is blocked by the test club 4, and thus the light receivers 56A and 56B cannot receive this light. The light receivers 56A and 56B detect this timing, and generate timing signals in response. The control device 50 commands the strobes 53, 53, 54 and 54 to emit light and commands the cameras 51 and 52 to shoot images, at a predetermined timing that is based on the time at which the timing signals are generated. Measurement data in the form of image data shot by the cameras 51 and 52 is transmitted to the control device 50, and is further transmitted to the fitting apparatus 2 from the control device 50.

1-2-2. Configuration of Fitting Apparatus

The fitting apparatus 2 is a general-purpose computer in terms of hardware, and is, for example, realized as a desktop computer, a laptop computer, a tablet computer, a smartphone, or the like. As shown in FIG. 2, the fitting apparatus 2 is manufactured by installing a fitting program 3 according to the present embodiment in a general-purpose computer. The fitting program 3 is acquired by the fitting apparatus 2 from a recording medium 20 such as a CD-ROM that is computer readable or via a communication network such as a Local Area Network (LAN) or the Internet that is connected to a communication unit 25. The fitting program 3 is software for analyzing the swing action based on measurement data transmitted from the computer system 5, and outputting information that supports selection of a golf club suitable for the golfer G. The fitting program 3 causes the fitting apparatus 2 to execute operations which will be discussed later.

The fitting apparatus 2 is provided with a display unit 21, an input unit 22, a storage unit 23, a control unit 24, and a communication unit 25. These units 21 to 25 are connected via a bus line 26, and are capable of communicating with each other. In the present embodiment, the display unit 21 is constituted by a liquid crystal display or the like, and displays information which will be discussed later to a user. Note that the user referred to here is a general term for a person who requires the results of fitting such as the golfer G himself, an instructor of the golfer G or a salesperson of golf clubs. The input unit 22 can be constituted by a mouse, a keyboard, a touch panel and the like, and receives operations on the fitting apparatus 2 by the user. The communication unit 25 is a communication interface that enables communication between the fitting apparatus 2 and an external device, and receives measurement data from the computer system 5.

The storage unit 23 is constituted by a nonvolatile storage device such as a hard disk. The measurement data transmitted from the computer system 5 is saved in the storage unit 23, in addition to the fitting program 3 being stored therein. Also, the storage unit 23 stores a club database (DB) 27, a head database (DB) 28, a shaft database (DB) 29, and a grip database (DB) 30. The club DB 27 stores information indicating various specifications (overall weight, head volume, shaft length, loft angle, balance, etc.) of a large number of golf clubs in association with information specifying the type of golf club. Similarly, the head DB 28 stores information indicating various specifications (weight, volume, loft angle, etc.) of a large number of heads in association with information specifying the type of head, the shaft DB 29 stores information indicating various specifications (weight, length, stiffness, etc.) of a large number of shafts in association with information specifying the type of shaft, and the grip DB 30 stores information indicating various specifications (weight, firmness, etc.) of a large number of grips in association with information specifying the type of grip.

The control unit 24 can be constituted by a CPU, a ROM, a RAM, and the like. The control unit 24 operates as an acquisition unit 24A, a calculation unit 24B, a selection unit 24C and a display control unit 24D in a virtual manner, by reading out and executing the fitting program 3 stored in the storage unit 23. The operations of the units 24A to 24D will be discussed in detail later.

1-3. Fitting Processing

Next, the fitting processing that is executed by the fitting system 100 will be described. First, to give an outline of this processing, measurement data that measures the action when the golfer G takes practice hits with the test club 4 is acquired, and the specifications (hereinafter, also referred to as optimal specifications) of a golf club suitable for the golfer G are determined, based on this measurement data. A golf club that matches the conditions of the optimal specifications is then selected as a golf club (hereinafter, also referred to as the optimal club) suitable for the golfer G, and recommended to the golfer G. It is thereby possible to provide the golfer G with the optimal club having optimal specifications matching the characteristics of the swing action of the golfer G. Hence, the shots of the golfer G can be improved, such as increasing the distance of shots and reducing lateral deflection.

In the present embodiment, the balance (hereinafter, also referred to as optimal balance) suitable for the golfer G is determined as an optimal specification. Balance, also known as swing weight, is an index representing how heavy the head feels when a golf club is swung, and influences the swing feel. Generally, balance is represented by a combination of the letters A to E and the numbers 0 to 9, with "A0" being the lightest and "E9" being the heaviest. The balance being "heavy" means that the center of gravity of the golf club is closer to the head and that the resistance of the head will be more noticeable when the golf club is swung, and, accordingly, could mean that the golf club is harder to swing. Conversely, the balance being "light" means that the center of gravity of the golf club is closer to the grip and that the resistance of the head will be less noticeable when the golf club is swung, and, accordingly, could means that the golf club is easier to swing. In the present embodiment, balance such as described above is taken into consideration, thus enabling the golfer G to be provided with a golf club whose swing feel matches the characteristics of his swing action.

Figure 3:
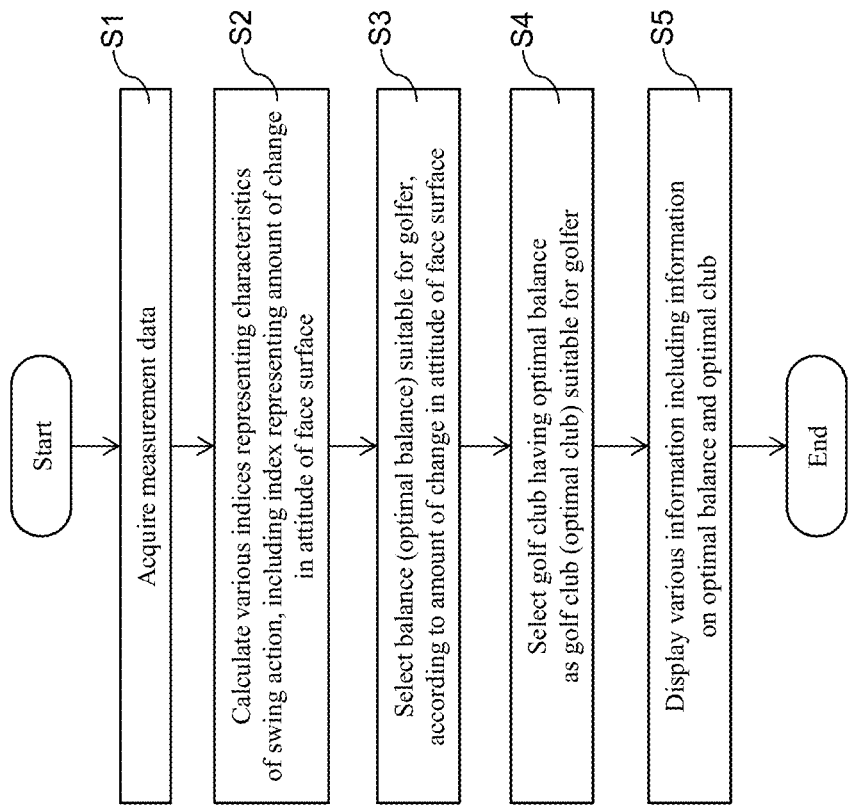
FIG. 3 is a flowchart showing the flow of fitting processing.

The fitting processing according to the present embodiment proceeds, more specifically, as shown FIG. 3. First, in step S1, measurement data is collected. More specifically, the golfer G stands on a hitting mat in which the camera system 5 has been installed, swings the test club 4, and hits a ball 60. At this time, the camera system 5 shoots image data that captures the action near the head 41 and the ball 60 around the time of impact. This image data is transmitted to the fitting apparatus 2 via the control device 50, as measurement data that measures the swing action of the test club 4 by the golfer G. On the other hand, on the fitting apparatus 2 side, the acquisition unit 24A acquires this measurement data via the communication unit 25, and stores the acquired measurement data in the storage unit 23.

Figure 4:
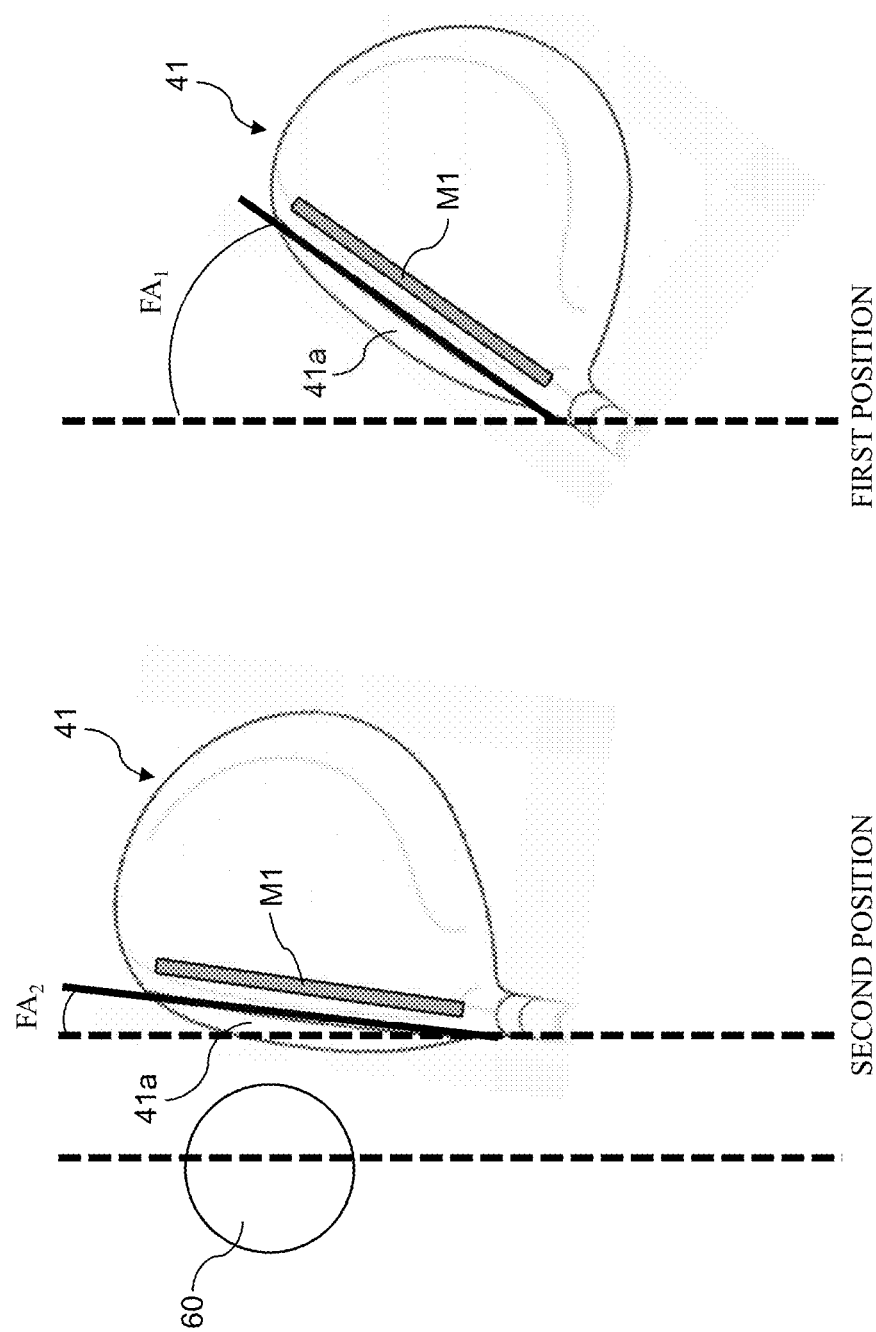
FIG. 4 is a diagram illustrating an index representing the amount of change in the attitude of the face surface of the head according to the first embodiment.

In the following step S2, the calculation unit 24B calculates various indices representing characteristics of the swing action of the golfer G, based on measurement data stored in the storage unit 23. In the present embodiment, an index $C_1$ representing the amount of change in the attitude (or the orientation) of the face surface 41a of the head 41 in the period before impact at the time of the swing action is calculated as one of the various indices. In the present embodiment, this index $C_1$ is calculated as the amount of change in a face angle. The face angle is one index representing the openness of the face surface 41a. In the present embodiment, as shown in FIG. 4, a face angle $FA_1$ at a first position separated by a predetermined distance from the ball 60 at address and a face angle $FA_2$ at a second position that is closer to the ball 60 than the first position but still separated by a predetermined distance from the ball 60 are calculated, and the index $C_1$ is calculated as the difference $FA_1-FA_2$. The first position and the second position are both positions through which the test club 4 passes immediately before impact.

In the present embodiment, the index $C_1$ is calculated by image processing the measurement data, which is image data shot by the camera system 5. As shown in FIG. 14, in the present embodiment, a band-shaped marker M1 is stuck on the crown part of the head 41 in alignment with the face surface 41a, so as to easily perceive the face angle. The marker M1 is formed with a material that efficiently reflects the light from the strobes 53 and 54. Accordingly, the region of the marker M1, or in other words, the band-shaped region aligned with the face surface 41a in a plan view of the head 41, appears clearly in the images shot by the cameras 51 and 52. The calculation unit 24B extracts the image of the marker M1 in the two images (images at the first position and second position) shot at the timing of light emission of the strobes 53 and 54 immediately before impact that are stored in the storage unit 23. The calculation unit 24B then calculates the face angles $FA_1$ and $FA_2$, based on the images of the marker M1, and calculates index $C_1=FA_1-FA_2$.

Calculation of an index $C_1$ such as described above in step S2 is based on the knowledge that the amount of change in the attitude of the face surface 41a in the period before impact at the time of the swing action influences the optimal balance. The inventors of the present invention gained this knowledge through the following testing.

First, the inventors got 27 test subjects to take practice hits with two golf clubs having different balances. One of the two golf clubs (hereinafter, also referred to as the normal club) had a balance "D5", and the other golf club (hereinafter, also referred to as the light balance club) had a balance "D2" that was lighter than the balance "D5". The normal club and the light balance club shared the same head and shaft, and the light balance club was prepared by changing the grip of the normal club to a heavier grip.

Also, the inventors calculated the index $C_1$ when each of the 27 test subjects took practice hits with the normal club using a similar measurement device and measurement method to those described above. Also, the club with the better shot results, out of the above two golf clubs, was specified for each of the 27 test subjects. The quality of the shot results was comprehensively evaluated by observing distance and directivity (lateral deflection). FIG. 5 is a table summarizing the result of this evaluation. From the testing results shown in this table, it was confirmed that the normal club tends to be more suitable for golfers for whom the index $C_1$, which is the amount of change in the face angle, is small, and the light balance club tends to be more suitable golfers for whom this index $C_1$ is large. Note that, in FIG. 5, a background color is given to results that deviate from the above tendency, with the threshold value for judging the magnitude of the index $C_1$ set to 6 deg. According to the testing results, the above tendency appeared in 24 out of 27 test subjects, that is, at a probability of over 88%. Therefore, it was found that the optimal balance can be determined, as long as the index $C_1$ representing the amount of change in the attitude of the face surface is known.

Based on the above knowledge, in the following step S3, the selection unit 24C selects the optimal balance, according to the magnitude of the index $C_1$ representing the amount of change in the attitude of the face surface 41a. More specifically, the selection unit 24C selects a lighter optimal balance as the index $C_1$ increases. At this time, the selection unit 24C compares the index $C_1$ with one threshold value determined in advance or a plurality of threshold values determined stepwise, judges which of ranges bounded by the one or more threshold values the index $C_1$ belongs to, and selects a lighter optimal balance as the values of the range to which the index $C_1$ belongs increase.

In the following step S4, the selection unit 24C selects a golf club having the optimal balance selected in step S3 as the optimal club. More specifically, the selection unit 24C searches the club DB 27, extracts a golf club that matches the conditions of the optimal balance, and specifies this golf club as the optimal club. Alternatively, the selection unit 24C may combine an appropriate head, shaft and grip that are extracted from the head DB 28, shaft DB 29 and grip DB 30 to create a golf club that matches the conditions of the optimal balance, and specify this golf club as the optimal club. At this time, input of information indicating the desires of a user relating to a golf club may be received from the user via the input unit 22, and an optimal club that matches these desires may be created. For example, the golfer G is able to specify the type of head that he likes. At this time, the selection unit 24C is able to create a golf club having a head of the specified type and the optimal balance selected in step S3, by extracting information indicating various specifications of a head of the specified type from the head DB 28, selecting an appropriate shaft and grip from the shaft DB 29 and grip DB 30, and combining the selected shaft and grip with the head.

In the following step S5, the display control unit 24D displays information specifying the optimal club selected in step S4 on the display unit 21, together with information on the optimal balance selected in step S3. A salesperson of golf clubs, an instructor or the like confirms such information on the display unit 21 with the golfer G, and recommends a golf club having the optimal balance to the golfer G. This ends the fitting processing.

2. Second Embodiment

Figure 6:
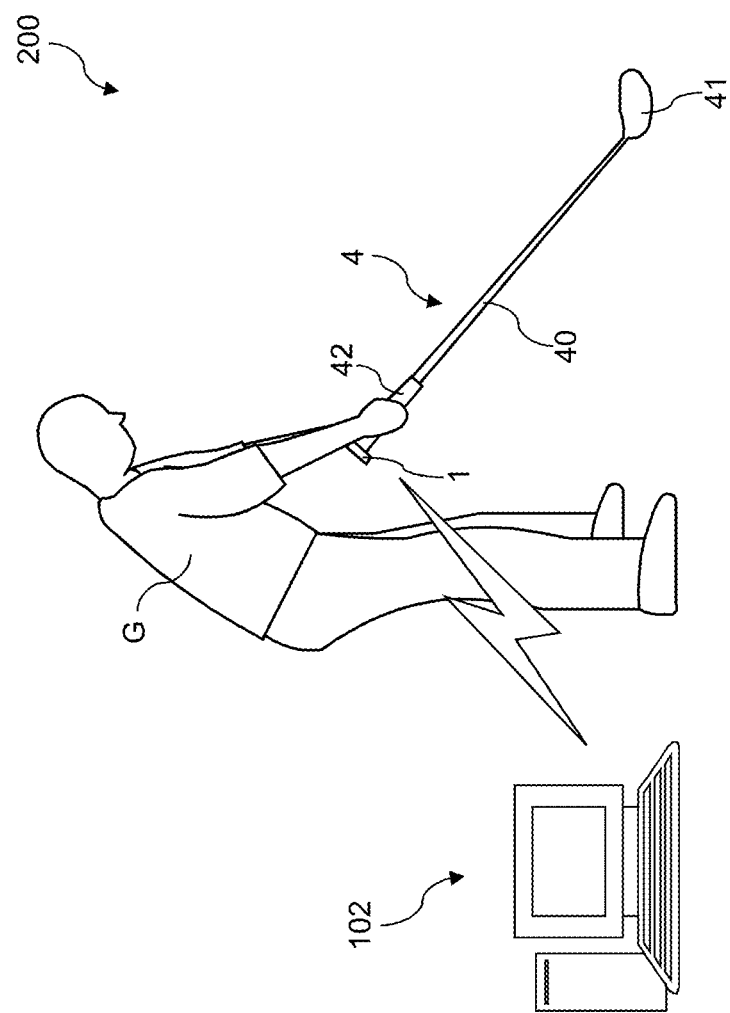
FIG. 6 is a diagram showing a fitting system provided with a fitting apparatus according to a second embodiment.
Figure 7:
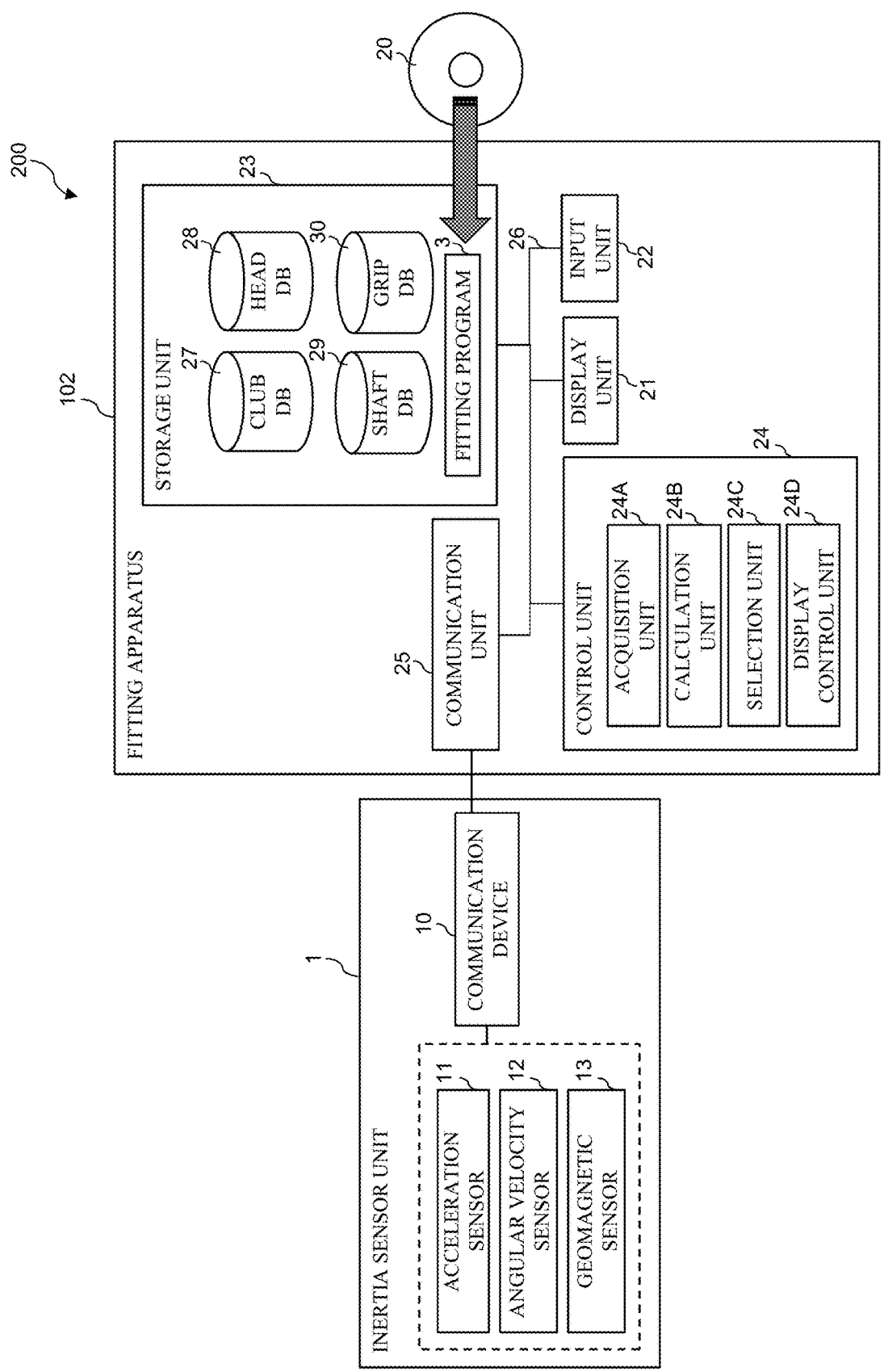
FIG. 7 is a functional block diagram of the fitting system according to the second embodiment.

The overall configuration of a fitting system 200 that has a fitting apparatus 102 according to a second embodiment is shown in FIGS. 6 and 7. The main difference between the first embodiment and the second embodiment is that the indices $C_1$ for selecting the optimal balance are different. Also, since the indices $C_1$ are different, the configuration of the measurement device that measures the measurement data for calculating these indices is also different. Hereinafter, description regarding the points in common with the first embodiment will be omitted, and the second embodiment will be described focusing on the differences between the two embodiments.

The measurement device that measures the swing action by the golfer G is, in the second embodiment, an inertia sensor unit 1. The inertia sensor unit 1 is, as shown in FIG. 6, attached to an end part of the grip 42 of the test club 4 on the opposite side to the head 41, and measures the behavior of the grip 42. The inertia sensor unit 1 is constituted to be compact and lightweight, so as to not interfere with the swing action. The inertia sensor unit 1 can be constituted to be detachable from the test club 4.

As shown in FIG. 7, an acceleration sensor 11, an angular velocity sensor 12 and a geomagnetic sensor 13 are installed in the inertia sensor unit 1. A communication device 10 for transmitting measurement data that is output by these sensors 11 to 13 to the external fitting apparatus 102 is also installed in the inertia sensor unit 1. Note that, in the present embodiment, the communication device 10 is a wireless communication device so as to not interfere with the swing action, but may be configured to connect to the fitting apparatus 102 via a cable in a wired manner.

The acceleration sensor 11, the angular velocity sensor 12 and the geomagnetic sensor 13 respectively measure acceleration, angular velocity and geomagnetism in an xyz local coordinate system whose origin is the attachment position of these sensors 11 to 13. More specifically, the acceleration sensor 11 measures accelerations $a_x$, $a_y$ and $a_z$ in the x-axis, y-axis and z-axis directions. The angular velocity sensor 12 measures angular velocities $\omega_x$, $\omega_y$ and $\omega_z$ about the x-axis, y-axis and z-axis. The geomagnetic sensor 13 measures geomagnetisms $m_x$, $m_y$ and $m_z$ in the x-axis, y-axis and z-axis directions. This measurement data is collected as time series data for a period from at least address to finish in a predetermined sampling period $\Delta t$, and transmitted to the fitting apparatus 102 via the communication device 10. The xyz local coordinate system is a three-axis orthogonal coordinate system, with the z-axis being oriented approximately parallel to the shaft 40. The x-axis is oriented so as to be as parallel as possible to the toe-heel direction of the head 41, and the y-axis is oriented so as to be as parallel as possible to the normal direction of the face surface of the head 41.

Next, the indices $C_1$ according to the second embodiment will be described. As described above, according to the knowledge gained by the inventors of the present invention, the amount of change in the attitude of the face surface 41a in the period before impact at the time of the swing action influences the optimal balance. In the first embodiment, an index $C_1$ representing the amount of change in the attitude of the face surface in the period before impact at the time of the swing action was given as the difference in face angles (FA$_1$–FA$_2$), whereas, in the second embodiment, two indices $C_{11}$ and $C_{12}$ that are defined as follows are calculated as indices $C_1$.

$$C_{11} = |\omega_{z\_imp} - \omega_{z\_top}|  \quad \text{Equation 1}$$

$$C_{12} = \int_{top}^{impact} |\omega_x| dt \quad \text{Equation 2}$$

Figure 8A:
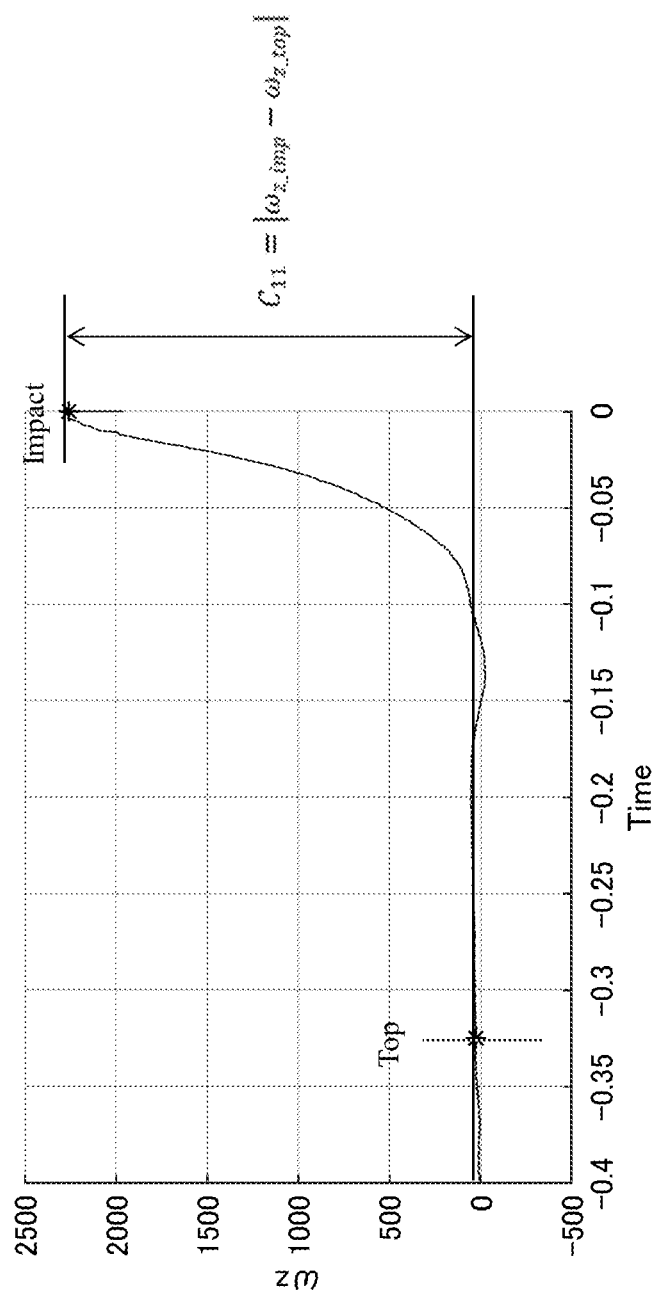
FIG. 8A is a diagram illustrating an index representing the amount of change in the attitude of the face surface of the head according to the second embodiment.
Figure 8B:
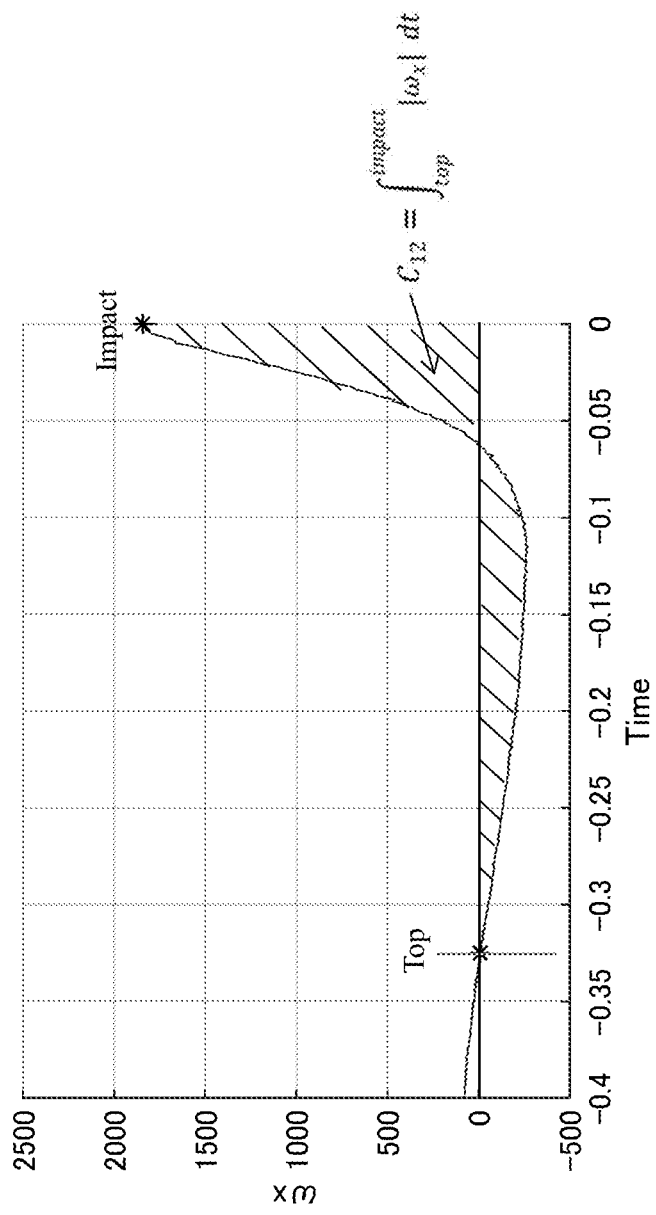
FIG. 8B is a diagram illustrating another index representing the amount of change in the attitude of the face surface of the head according to the second embodiment.

Here, $\omega_{z\_imp}$ is the angular velocity $\omega_z$ at the timing of impact, and $\omega_{z\_top}$ is the angular velocity $\omega_z$ at the timing of top. Also, the integration that is included in $C_{12}$ represents integration from the timing of top to the timing of impact. FIGS. 8A and 8B are diagrams illustrating the indices $C_{11}$ and $C_{12}$, using graphs of $\omega_z$ and $\omega_x$ obtained through actual measurement.

Figure 9:
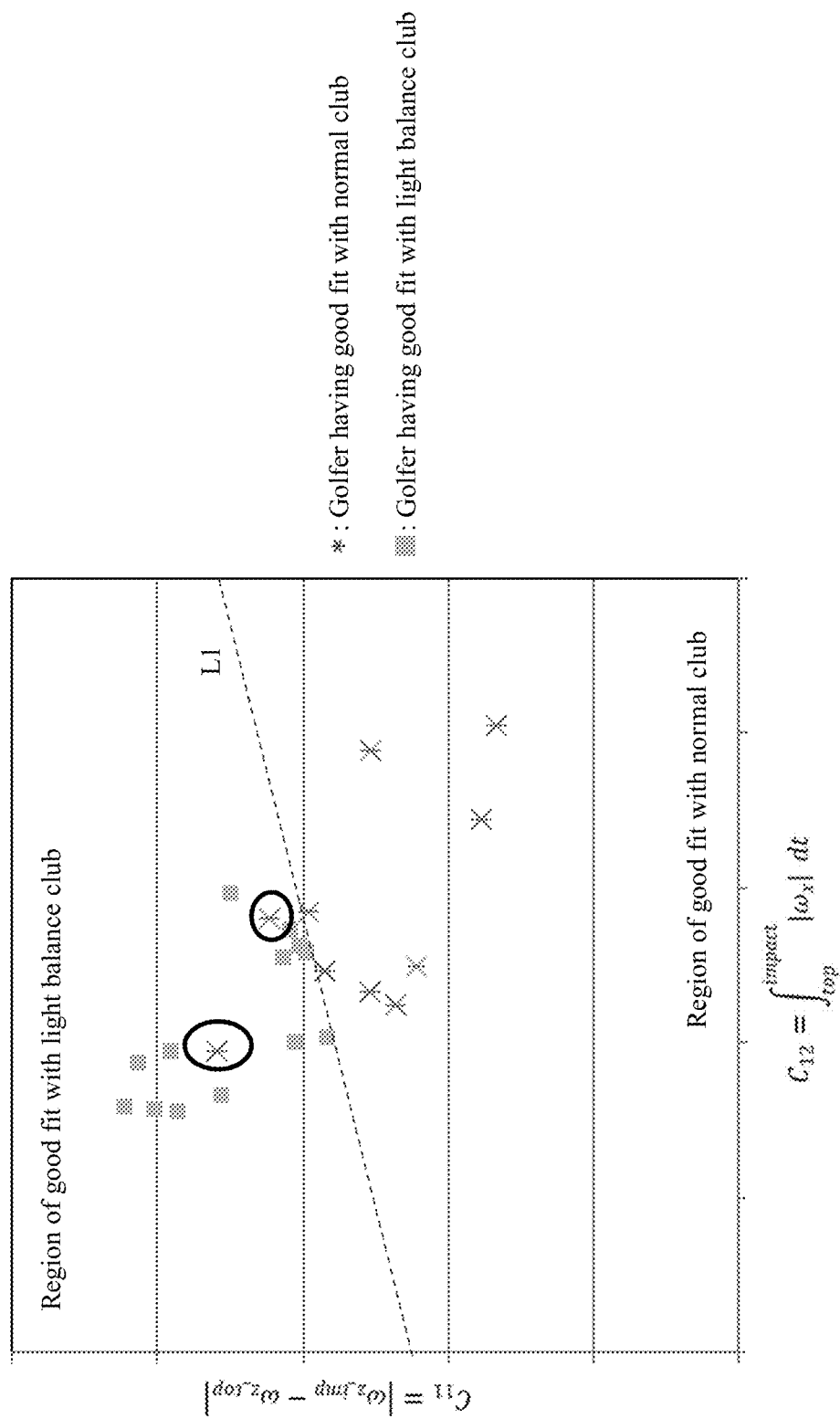
FIG. 9 is a graph summarizing the relationship of optimal balance with two indices representing the amount of change in the attitude of the face surface of the head according to the second embodiment when a large number of golfers have actually taken practice hits with golf clubs.

The inventors of the present invention conducted testing that involved getting 23 test subjects to take practice hits with two golf clubs, namely, the abovementioned normal club and light balance club. The inventors then calculated the indices $C_{11}$ and $C_{12}$ when each of the 23 test subjects took practice hits with the normal club using a similar measurement device and measurement method to those described above. Also, the club with the better shot results, out of the above two golf clubs, was specified for each of the 23 test subjects. The quality of the shot results was evaluated similarly to the first embodiment. FIG. 9 is a graph summarizing the result of this evaluation. From the testing results shown in this graph, it was confirmed that the normal club tends to be more suitable for golfers for whom the index $C_{11}$ is small, and the light balance club tends to be more suitable for golfers for whom the index $C_{11}$ is large. Also, it was confirmed that the light balance club tends to be more suitable for golfers for whom the index $C_{12}$ is small, and the normal club tends to be more suitable for golfers for whom the index $C_{12}$ is large. Although the indices $C_{11}$ and $C_{12}$ both represent the amount of change in the attitude of the face surface 41a at the time of the swing action, $\omega_z$ is, however, more dominant than $\omega_x$ with respect to the openness of the face surface 41a. As a result, the above tendency is more pronounced for the index $C_{11}$ than for the index $C_{12}$.

As a result of the above, it was found that, as shown in FIG. 9, a plane whose axes are the indices $C_{11}$ and $C_{12}$ is divided by a straight boundary line L1 into a region in which the normal club is a good fit and a region in which the light balance club is a good fit. Note that, in FIG. 9, results that deviate from the above tendency are circled. According to these testing results, the above tendency appeared in 21 out of 23 test subjects, that is, at a probability of over 91%. Therefore, it was found that the optimal balance can be determined as long as the amount of change in the attitude (openness) of the face surface 41a at the time of the swing action, such as defined by the indices $C_{11}$ and $C_{12}$, is known.

Based on the above knowledge, in step S1 of the fitting processing according to the second embodiment, measurement data including angular velocity data at the time of the swing action by the golfer G is collected by the inertia sensor unit 1, and acquired by the acquisition unit 24A.

In the following step S2, the calculation unit 24B calculates the above indices $C_{11}$ and $C_{12}$, as two of various indices representing characteristics of the swing action of the golfer G, based on the measurement data. At this time, the indices $C_{11}$ and $C_{12}$ can be calculated, based on data of the angular velocities $\omega_x$ and $\omega_z$ included in the measurement data.

In the following step S3, the selection unit 24C selects the optimal balance, according to the magnitude of the indices $C_{11}$ and $C_{12}$ calculated in step S2. More specifically, the selection unit 24C plots the values of the indices $C_{11}$ and $C_{12}$ calculated in step S2 on a plane whose axes are these two indices, and judges which of regions that are divided by a boundary line (refer to L1 in FIG. 9) determined in advance the plotted points belong to within this plane. The selection unit 24C then selects the balance that is associated in advance with the region to which the plotted points belong as the optimal balance. Note that, although there is one boundary line in the example of FIG. 9, the boundary line referred to here can be set to one or more boundary lines, and the optimal balance selected from two or three balances or more. Steps S4 and S5 after the optimal balance has been selected are similar to the first embodiment.

3. Variations

Although a number of embodiments of the present invention have been described above, the present invention is not limited to the above embodiments, and various modifications that do not depart from the gist of the invention can be made. For example, the following modifications can be made. Also, the substance of the following variations can be combined as appropriate.

3-1

In the above embodiments, the camera system 5 or the inertia sensor unit 1 is used as a measurement device for measuring the swing action. However, the configuration of the measurement device is not limited thereto and can be modified as appropriate. For example, a three-dimensional motion capture system, a distance image sensor or the like may be used, or a plurality of types of measurement devices may be selected from those illustrated here or from other measurement devices, and the selected measurement devices may be used in combination.

3-2

In the above embodiments, in step S5, information specifying the optimal club and information on the optimal balance are both displayed on the display unit 21, but a configuration may be adopted in which only one thereof is displayed. For example, in the case where only information on the optimal balance is displayed, a salesperson of golf clubs, an instructor or the like who views this information may search catalogs and the like for a golf club that matches the optimal balance, and recommend the matching golf club to the golfer G. Note that in the case where information specifying the optimal club is not displayed in step S5, step S4 can be omitted. Step S3 can also be omitted, in addition to step S4. In this case, by displaying the indices $C_1$ in step S5, people can also perform the omitted step S3, while referring to information prepared in advance that represents the relationship between the indices $C_1$ and the optimal balance.

Also, the selection unit 24C may derive a customization method for customizing a specific golf club so as to achieve the optimal balance, and the display control unit 24D may display the derived customization method on the display unit 21. For example, the amount of weight to be attached to the grip, head or the like of a specific golf club may be calculated, in order to achieve the optimal balance, and the calculated weight may be displayed as the customization method.

3-3

The abovementioned indices $C_1$ are illustrative examples, and can be modified as appropriate. For example, the following index $C_{11}'$ can also be used instead of the index $C_{11}$ according to the second embodiment, and the following index $C_{12}'$ can also be used instead of the index $C_{12}$.

Furthermore, the start point and end point of the integration interval of $C_{12}$ and $C_{11}'$ can also be set to a timing other than top and impact, and the timing of the angular velocity at which the difference between $C_{11}$ and $C_{12}'$ is taken can also be set to a timing other than top and impact.

$$C_{11}'=\int_{top}^{impact}|\omega_z|dt \qquad \text{Equation 3}$$

$$C_{12}'=|\omega_{x\_imp}-\omega_{x\_top}| \qquad \text{Equation 4}$$

Also, indices relating to $\omega_z$ such as $C_{11}$ and $C_{11}'$ and indices relating to $\omega_x$ such as $C_{12}$ and $C_{12}'$ need not be combined, and the optimal balance may be selected, according to only indices relating to either $\omega_z$ or $\omega_x$. In this case, however, it is desirable to use indices relating to $\omega_z$ which is more dominant with respect to the amount of change in the openness of the face surface 41a.

Various indices $C_1$ were described above, but the optimal balance can be determined according to one or a combination these indices.

3-4

The optimal balance can also be selected by combining a preliminary index representing another characteristic of the swing action with one or more of the abovementioned indices $C_1$. The preliminary index is an index that is preliminarily taken into consideration in order to select the optimal balance. The preliminary index referred to here is, for example, an index such as the following.
(1) Power (hereinafter, arm output power) $P_1$ output by the arms of the golfer G during the swing action
(2) Power (hereinafter, club input power) $P_2$ input to the test club 4 during the swing action
(3) Energy (hereinafter, exertion energy) $E_1$ exerted by the golfer G during the swing action
(4) Torque (hereinafter, exertion torque) T exerted by the golfer G during the swing action The arm output power $P_1$ is a known index that is described in detail in JP 2017-170105A and the like, and can be defined as shown in the following equation.

$$P_1=T_{g1}\omega_1-T_{g2}\omega_1 \qquad \text{Equation 5}$$

Figure 10:
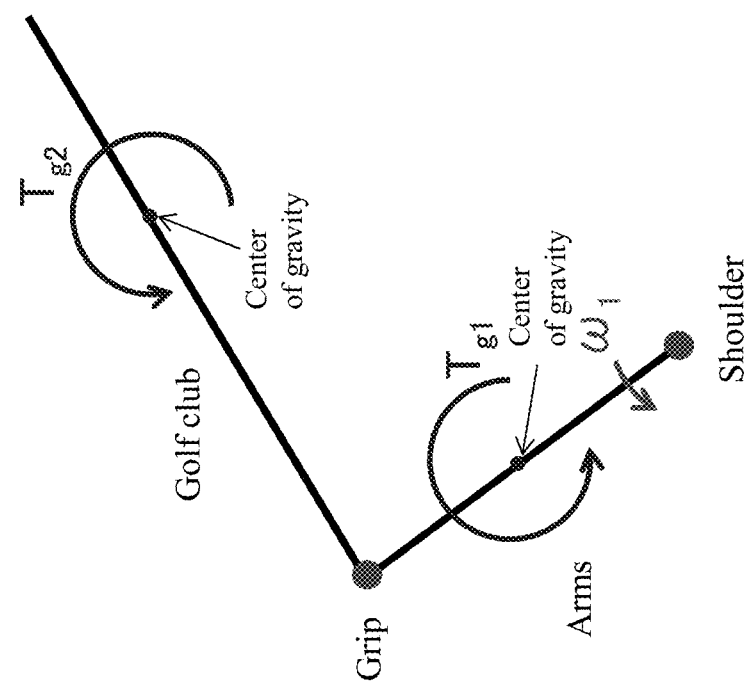
FIG. 10 is a diagram illustrating a model for calculating preliminary indices.

Here, $T_{g1}$ signifies torque about the center of gravity of the arms of the golfer G, $T_{g2}$ signifies torque about the center of gravity of the golf club, and on signifies the angular velocity of the arms of the golfer G. The arm output power $P_1$ can be analyzed using a pendulum model in which the arms and the golf club are links and the shoulder and the grip are nodes, such as shown in FIG. 10. Although not limited thereto, an average arm output power $P_1$ that occurs during the swing action (hereinafter, also referred to as $P_{1\_AVE}$), which is calculated by integrating the arm output power $P_1$ in the interval from the time at top to the time at which the arm output power $P_1$ takes the maximum value and dividing this integrated value by the integration interval, may be calculated as a preliminary index.

Figure 11:
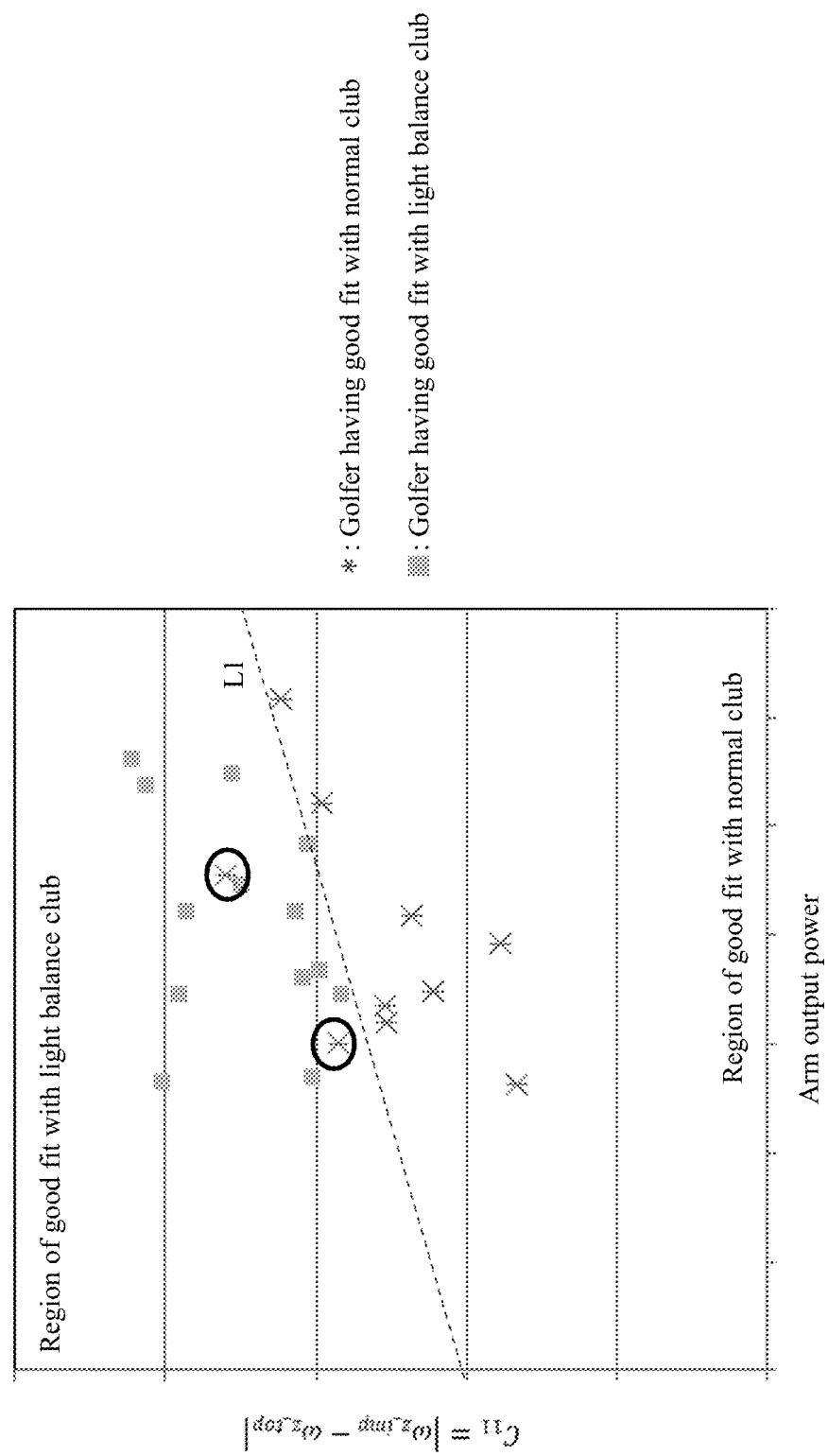
FIG. 11 is a graph summarizing the relationship of optimal balance with two indices according to a variation when a large number of golfers have actually taken practice hits with golf clubs.

Note that FIG. 11 shows the result of calculating the arm output power $P_{1\_AVE}$, from measurement data acquired in the same testing as FIG. 9, and plotting this arm output power $P_{1\_AVE}$ and the index $C_{11}$ on a plane whose axes are these two indices. From this diagram, it was confirmed that, in the case where the index $C_{11}$ and the arm output power $P_{1\_AVE}$ are used, golfers for whom the normal club is a good fit and golfers for whom the light balance club is a good fit can also be stratified, with a high probability similar to the case of FIG. 9. Therefore, it was found that the optimal balance can be accurately determined, by combining the arm output power $P_1$ with the indices $C_1$. The optimal balance can also be determined, in the case where a preliminary index other than the arm output power $P_1$, such as (2) club input power $P_2$, (3) exertion energy $E_1$ or (4) exertion torque T, is combined with the indices $C_1$.

The club input power $P_2$ is a known index that is described in detail in JP 2017-170105A and the like, and can be defined as shown in the following equation.

$$P_2=R_2v_g^T \qquad \text{Equation 6}$$

Here, $R_2$ is the constraint force acting on the grip, and $v_g$ is the velocity vector of the grip. The club input power $P_2$ can also be analyzed using a pendulum model in which the arms and the golf club are links and the shoulder and the grip are nodes, such as shown in FIG. 10. Note that, although not limited thereto, the club input power $P_2$ serving as a preliminary index can be calculated as an average club input power $P_2$ that occurs during the swing action, and, for example, can be calculated by integrating the club input power $P_2$ in the interval from the time at top to the time at which the club input power $P_2$ takes the maximum value, and dividing this integrated value by the integration interval.

The exertion energy $E_1$ is also a known index that is described in detail in JP 2017-170105A and the like, and can, for example, be defined as the workload that is exerted by the arms of the golfer G, or as the average workload that is exerted on average per unit time by the arms of the golfer G. The workload of the arms can, for example, be calculated as an integrated value obtained by integrating a work rate $E_1'$ of the arms such as shown below for a predetermined period (e.g., from the time at top to the time at which the work rate $E_1'$ of the arms changes from positive to negative after top), and the average workload of the arms can be calculated as a value obtained by dividing such an integrated value by the length of the integration interval.

$$E_1'=R_2v_g^T+T_{g1}\omega_1-T_{g2}\omega_1 \qquad \text{Equation 7}$$

The exertion torque T is also a known index that is described in detail in JP 2017-170105A and the like, and can, for example, also be defined as an integrated value obtained by integrating the torque about the shoulder of the golfer G for a predetermined period (e.g., from top to impact), or can be defined as a value obtained by dividing this integrated value by the length of the integration interval, that is, as an average torque about the shoulder that is exerted on average per unit time.

Various preliminary indices were described above, and the optimal balance can be determined, by combining one or more of preliminary indices with one or more of the abovementioned indices.

LIST OF REFERENCE NUMERALS 100, 200 Fitting system
1 Inertia sensor unit (measurement device)
2, 102 Fitting apparatus
24A Acquisition unit
24B Calculation unit
24C Selection unit
24D Display control unit
3 Fitting program
4 Test club
40 Shaft
41 Head
42 Grip
5 Camera system (measurement device)
G Golfer

The invention claimed is:

1. A fitting apparatus comprising:
   an acquisition unit configured to acquire measurement data obtained by measuring a swing action of a test club by a golfer with a measurement device;
   a calculation unit configured to calculate an amount of change in an openness of a face surface of a head included in the test club in a period before impact at a time of the swing action, based on the measurement data; and
   a selection unit configured to select a balance of a golf club suitable for the golfer, according to the amount of change,
   wherein the amount of change includes a first index calculated based on an angular velocity about an axis that is parallel to a shaft included in the test club, and a second index calculated based on an angular velocity about an axis that is parallel to the toe-heel direction of the head.

2. A non-transitory computer readable medium storing a fitting program configured to cause a computer to execute:
   acquiring measurement data obtained by measuring a swing action of a test club by a golfer with a measurement device;
   calculating an amount of change in an attitude openness of a face surface of a head included in the test club in a period before impact at a time of the swing action, based on the measurement data; and
   selecting a balance of a golf club suitable for the golfer, according to the amount of change,
   wherein the amount of change includes a first index calculated based on an angular velocity about an axis that is parallel to a shaft included in the test club, and a second index calculated based on an angular velocity about an axis that is parallel to the toe-heel direction of the head.

3. A fitting method comprising:
   acquiring measurement data obtained by measuring a swing action of a test club by a golfer, using a measurement device;
   calculating an amount of change in an openness of a face surface of a head included in the test club in a period before impact at a time of the swing action, based on the measurement data, using a computer; and
   recommending a golf club having a balance suitable for the golfer that is determined according to the amount of change to the golfer,
   wherein the amount of change includes a first index calculated based on an angular velocity about an axis that is parallel to a shaft included in the test club, and a second index calculated based on an angular velocity about an axis that is parallel to the toe-heel direction of the head.

4. A fitting apparatus comprising:
   an acquisition unit configured to acquire measurement data obtained by measuring a swing action of a test club by a golfer with a measurement device;
   a calculation unit configured to calculate an amount of change in an attitude of a face surface of a head included in the test club in a period before impact at a time of the swing action, based on the measurement data; and
   a selection unit configured to select a balance of a golf club suitable for the golfer, according to the amount of change,
   wherein the amount of change includes a first index calculated based on an angular velocity about an axis that is parallel to a shaft included in the test club, and a second index calculated based on an angular velocity about an axis that is parallel to the toe-heel direction of the head.

* * * * *